Dec. 28, 1954   B. J. MERKLE   2,698,393
ELECTRIC MOTOR HOUSING
Filed Jan. 19, 1953
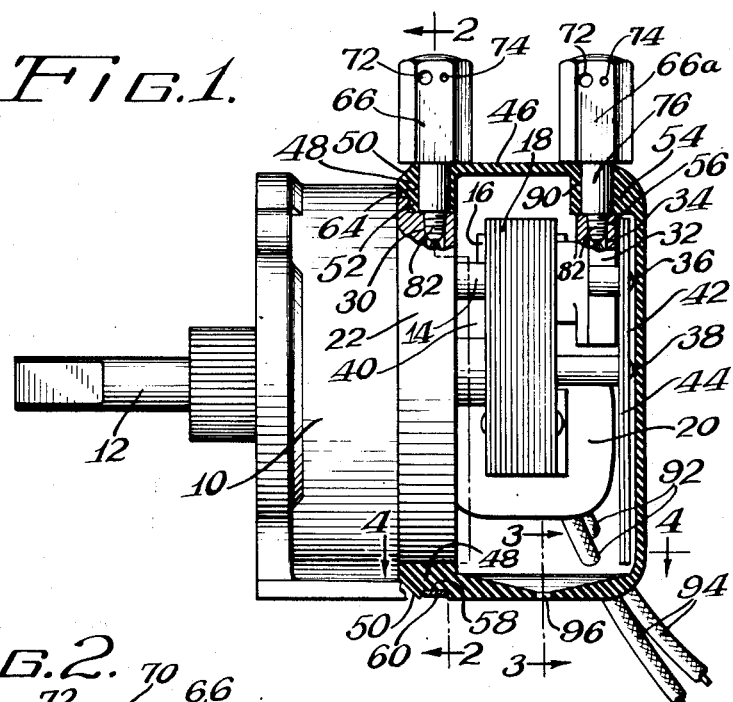
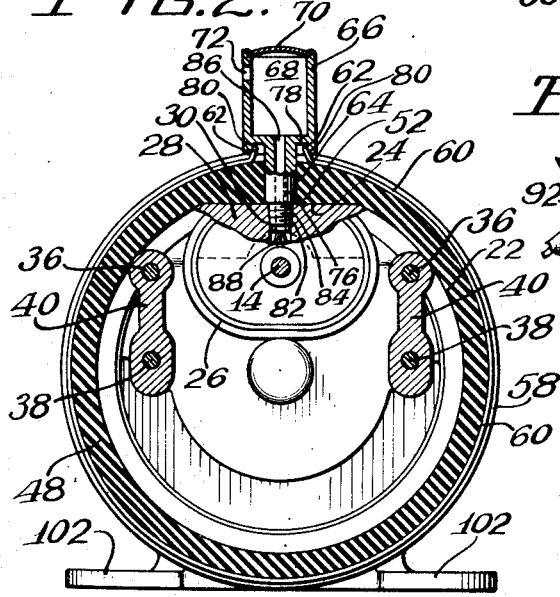
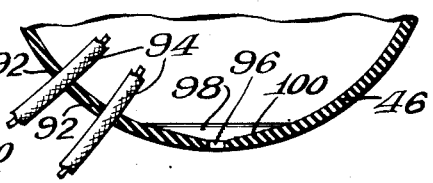
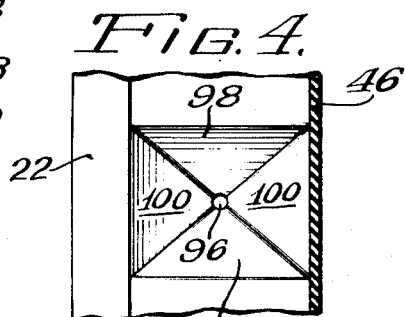
Inventor:
Bernard J. Merkle
By Kent W. Worrell
Atty.

//! PATENT_TEXT

United States Patent Office 2,698,393
Patented Dec. 28, 1954

2,698,393

ELECTRIC MOTOR HOUSING

Bernard J. Merkle, Chicago, Ill.

Application January 19, 1953, Serial No. 331,856

9 Claims. (Cl. 310—89)

This invention relates in general to a reduction gear drive and is more particularly described as an enclosure for an electric motor of a combined reduction gear and its electric driving motor.

For many purposes, a reduction gear having an attached electric driving motor does not need special protection for the motor, but for certain uses where the reduction gear driving unit is located in an exposed relation subject to dust, dirt, liquids and the condensation of vapors thereon, it is necessary to protect the motor and its operating parts in order to prevent deterioration and undue wearing thereof. The reduction gear proper is usually enclosed in a casing which if not air tight, still does prevent the accumulation of dirt and moisture which would tend to cause abrasion, wearing and deterioration of the gears.

The present invention therefore relates to an enclosing cover for a driving motor which is directly connected to a reduction gear drive in such a manner that the cover is attached to a common supporting plate and encloses all of the operating parts of the motor.

An important object of the invention is to provide an enclosing cover of flexible resilient material such as rubber or a rubber substitute which may be formed or molded to extend entirely around the parts to be protected and to provide means for attaching the cover to a common supporting part for the combined unit.

A further object of the invention is to provide improved means for attaching the cover to the supporting casing.

A still further object of the invention is to provide oil cups which extend through the cover and one of which provides means for holding the cover in place.

A still further object of the invention is to provide a semi-rigid cover of this kind which has a drip receiving, converging surface at its bottom for draining surplus oil or other liquid from the casing.

Other objects of the invention will appear in the specification and will be apparent from the accompanying drawings in which, Fig. 1 is a side elevation partly in section of a reduction gear drive casing and an electric motor connected thereto with a cover, in accordance with this invention, extending over the motor and attached to the casing.

Fig. 2 is a sectional view taken on the line 2—2 of Fig. 1;

Fig. 3 is a sectional view taken on the line 3—3 of Fig. 1; and Fig. 4 is a plan view of the bottom discharge for the cover as taken on the line 4—4 of Fig. 1.

This invention is referably applied to a small fractional horsepower driving motor and a reduction gearing attached thereto which reduces the speed of the electric motor to a delivered speed from the reduction gearing usually of the order of a few revolutions per minute, although of course, the speed of the delivery shaft may be considerably more than this if desired. Motors of this kind are commonly employed for any service where a very few rotations of a driving shaft are required, but where the electric motor usually receives its current from a standard source of supply, usually of 110 volts. In some locations of this reduction gear drive such as in refrigerators and in moist, wet or dusty places, it is a distinct advantage to have the motor entirely covered, although it is common practice to use an apparatus of this kind in continuous service with the motor exposed and having no protection.

Referring now more particularly to the drawings, a reduction gear casing 10 has a delivery shaft 12 at one side and a motor shaft 14 at the other side connected to a rotor 16 of an electric motor having a laminated armature 18 and a winding 20 surrounding the armature in a well known manner.

At the back of the gear casing, is a reduced shoulder ring 22 having a flattened portion 24 at the upper side adjacent but overlying the motor shaft 14. The shaft is surrounded by an oval oil receptacle 26 with a ledge 28 across the top terminating in the flattened portion 24. Extending downwardly through this ledge 28 is a perforation 30 which communicates with the interior of the oil receptacle 26 which is usally filled with felt (not shown) or other similar material to communicate lubrication to the shaft 14 at this side of the motor. At the other side of the motor is a somewhat similar oiling receptacle 32 having an opening 34 at its top through which lubricant may be applied to the shaft at this side of the motor preferably by means of a felt (not shown) or other suitable liquid conducting material. Bearings for the ends of the motor shaft are commonly included in the oil receptacles 26 and 32 which form no particular part of the present application and the motor including the outer bearing and receptacle 32 is secured to the casing by means of bolts 36 and 38 which extend through the ends of the outer oil receptacle 32 and through the motor armature into projections 40 cast at the back of the casing 10 and having a flat rear surface which contacts the approximate surface of the motor armature as shown in Fig. 1.

A metal abutment plate 42 with a fiber plate 44 of the same dimensions is attached close to the heads of the bolts 36 and covers substantially the same outline as the reduced shoulder ring 22 and at a distance therefrom at the outer side of the motor.

To this assembly of the electric motor at the rear side of the reduction gear casing is applied a flexible resilient cover 46 which may be of rubber, a rubber composition or synthetic material which is flexible and resilient like rubber and preferably one which is not affected by ordinary liquids, oil, water, and has a smooth interior and exterior surface. This cover is in the form of a cup which is applied over the motor and over the abutment plate 42, the bottom of the cup engaging the outer face of the plate 42 and the edge of the cup having a thickened rim 48 extending inwardly all around the edge of the cup with a beveled outer edge 50 extending to the outer surface of the casing 10. At the top of the cover is a flattened chord portion 52 which conforms to the flattened portion 24 of the casing as shown in Fig. 2 so that the cover fits tightly upon the reduced shoulder portion 22 and upon the flattened portion 24 to seat it firmly in place. Within the cover and located at the top innermost portion thereof is a similar top chord portion 52 which corresponds with the top surface 56 of the oiling receptacle 32 so that the portion 54 fits tightly thereon.

In the outside of the thickened rim portion is an outer groove 58 in which a metal binding strap 60 is seated, the strap having angularly upset ends 62 spaced apart but adjacent each other at the upper side of the cover. In the thickened portion of the rim as formed by the chord 52 is an opening 64 extending to the oiling perforation 30 of the ledge 28.

An oil cup 66 has a hollow chamber 68 with a closed top 70 and an oiling aperture 72 near its top with a separate air inlet 74 adjacent thereto. The oil cup has a depending stem 76 with an undercut groove 78 surrounding the stem at the bottom of the cup, the outer edge 80 of the groove inclining inwardly toward the top so that the bent ends 62 of the strap 60 are engaged thereby. At the end of the stem is a threaded portion 82 below a shoulder 84 near the end of the stem and this threaded portion is of hardened metal and shaped to cut a thread in a softer metal to which it is applied. The stem has a bore 86 extending from the bottom of the hollow chamber 68 and a brush or wick 88 of fibrous material is commonly inserted in the bore 86 to prevent oil from running too freely out of the chamber 68, and also to provide a feeder wick for oil when the unit is positioned on its side.

When the stem 76 is inserted through the opening 64 of the cover rim 48 and the threaded portion 82 is inserted into the perforation of the oil receptacle 26, the bent extremities 62 of the clamping ring are engaged by the inclined edge 80 at the side of the undercut groove. The more the threaded portion is inserted into the opening 30, the tighter the clamping ring is turned up by the oil cup and the more tightly the cover is drawn upon the reduced shoulder portion 22.

An outer oil cup 66a is similar in all respects to the oil cup 66 but does not require an undercut groove 80 as in the oil cup 66 but the stem 76 thereof is inserted through a perforation 90 of the thickened chord portion 54 within the cover and the threaded stem 82 thereof is inserted in the opening 34 of the outer oiling receptacle 32 and cuts its own thread therein as the oil cup is rotated. The insertion of each of these oil cups is limited by the engagement of the shoulder 84 with the top of the member in which it is inserted and in this position, the two oil cups firmly locate the cover upon and around the electric motor, the bottom of the cup being parallel with and closely adjacent the abutment plate 42 which is prevented from collapsing inwardly by the plate and the cover being tightly held in place by the binding strap 60 which is tightened in place by the oil cup 66. Thus the oil cups locate and position the cover, they fasten the cover tightly in place; they form their own threads when applied to a metal which is softer than the metal of the oil cup, and they provide means for lubricating the bearings of the motor and the interior of the casing at the approximate end of the motor shaft. To preserve the tight fit of the cover with respect to the electric motor, openings 92 are provided near the bottom of the cover 46 through which conductors 94 may be inserted for fluid-tight engagement therewith.

In the bottom of the cover, there may be a discharge opening 96 for excess oil, other liquids or dirt which may fall or drip from the motor to the bottom of the casing which may engage the opposite inclined surfaces 98 or 100 leading to the discharging opening 96 as the center thereof.

The casing may also be formed with two inclined inner portions extending entirely around the inside thereof, or partially around it, and converging at the center as shown in Fig. 1. With this construction, the combined unit may be supported at any relative angular position and the opening 96 may then be made at the lowest point of the cover.

With this construction, an electric motor is protected at all times and the cover is easily applied to or removed from the casing of the reduction gear for access to the motor. Although the motor is described as supported upon feet 102 at the bottom of the casing, it is apparent that these feet may be located at any point about the periphery, but the oil cups may be placed at the upper edge of the casing, or if at a lower elevation, the cups 66 should be turned so that the openings 72 and 74 are at the upper side.

While a preferred construction has been described in some detail, it should be regarded as an illustration or example rather than as a limitation or restriction of the invention, since various changes in the construction, combination and arrangement of the parts may be made without departing from the spirit and scope of the invention.

I claim:

1. The combination with a reduction gearing having a closed casing and an electric motor attached at one side of the casing having a shaft extending into the casing for driving the reduction gearing, a flexible resilient cover of rubber and the like in the form of a cup fitting entirely over and around the electric motor, the casing having a shouldered portion at the side adjacent the motor, the cover having a thickened rim overlapping and engaging the shoulder portion of the casing and adhering thereto for entirely closing the motor, an oiling aperture at the top of the casing in the shouldered portion and the motor having an oil receptacle at the outer side of the motor with the top opening therein, and oil cups insertable through the cover at the top thereof and into the oil holes at the top of the casing and for the top oiling receptacle of the motor.

2. The combination with a reduction gearing having a closed casing and an electric motor attached at one side of the casing having a shaft extending into the casing for driving the reduction gearing, a flexible resilient cover of rubber and the like in the form of a cup fitting entirely over and around the electric motor, the casing having a shouldered portion at the side adjacent the motor, the cover having a thickened rim overlapping and engaging the shoulder portion of the casing and adhering thereto for entirely enclosing the motor, the top of the casing being provided with a top oil receiving opening in the shouldered portion thereof, a binding strip encircling the cover at the marginal rim thereof and having upward projections at the sides of an opening therethrough, and an oil cup insertable through the opening in the cover and into the oiling opening in the casing, the under edge of the oil cup having inclined surfaces for engaging the inclined extremities of the binding strip for tightening the strip around the margin of the cover as the oil cup is inserted into the oiling opening.

3. The combination with a reduction drive gearing having a casing with a shouldered portion at one side thereof, of an electric motor connected to the shouldered side of the casing, a flexible resilient cover of rubber and like material adapted to fit entirely over the motor and having a rim portion to fit the shouldered portion at the edge of the casing, the casing having an oiling aperture at the top thereof, the cover having a groove at the outside of the rim in line with the oiling opening, a hole through the cover registering with the said opening, a binding strap with upwardly inclined ends, and an oiling cup having a stem insertable through the opening of the cover and into the opening of the casing, the lower edge of the oil cup having a recess with upwardly converging sides around the stem, the inclined sides engaging the ends of the strap for drawing the strap up tightly about the cover as the oil cup is inserted and thereby binding the cover to the casing.

4. A structure in accordance with claim 3, in which the stem of the oil cup is of harder material than the material of the casing and the extremity of the stem having a thread forming groove which is inserted into the oil hole of the casing cutting its own threads as the oil cup is inserted and at the same time tightening the strap about the cover and onto the shouldered portion of the casing.

5. The combination with a reduction gear driving including a casing with a shouldered portion at one side, of an electric motor for driving the gearing attached to the shouldered portion of the casing and substantially of the same size as the casing, a plate also of approximately the same size as the shouldered portion of the casing attached to the outer side of the motor and thereby supported by the casing, and a cover of flexible resilient material to fit over the motor and over the plate at the outer side thereof, the cover having a rim to engage the shouldered portion of the casing, and means for binding the rim of the cover about the shouldered portion of the casing.

6. A cover for the electric motor of a combined reduction gear having a casing and a driving motor for the gearing secured to one side of the casing, the cover being of flexible resilient material fitting over the motor and having a rim engaging the casing, means for securing the cover in place, means for oiling the motor through the cover at the top thereof, and a relief opening for liquids at the bottom of the cover, the inside surface of the cover being inclined downwardly toward the opening at all sides thereof so that any liquid and other materials will tend to drain outwardly at the bottom through the opening.

7. The combination with a reduction drive gearing having a casing with a shouldered portion at one side thereof, of an electric motor connected to the shouldered side of the casing, a flexible resilient cover of rubber and like material adapted to fit entirely over the motor and having a rim portion to fit the shouldered portion at the edge of the casing, the casing having an oiling aperture at the top thereof, the cover having a hole registering with the said aperture, an oiling cup having a stem insertable through the hole in the cover and into the aperture of the casing, the motor having an outer bearing with an oiling opening at the top thereof, and the cover has an opening to register with the opening in the bearing and an oil cup for the said registering openings having a stem adapted to be inserted through the cover and into the opening of the outer bearing, the end of the oil cup stem having a portion which cuts its own thread into the bearing material as the oil cup is inserted therein.

8. A structure in accordance with claim 7 in which the oil cups at the top of the cover are provided with oiling apertures and with air inlet apertures, the bottom of the cover has a liquid discharge opening with inclined surfaces leading thereto at four sides thereof and the cover has openings above the inclined surfaces of the oil drain, and covered electrical conductors for the motor extending tightly through the said openings in the cover.

9. A structure in accordance with claim 1, in which the oiling aperture at the top of the casing and the oil receptacle at the outer side of the motor are located in flattened portions at the top of the casing and at the top of the motor oil receptacle, and the cover has corresponding thicker and flattened portions in the rim and at the inside of the cover for fitting the flattened shouldered portions of the casing and oil receptacle respectively and the said oil cups being insertable through the said thickened and flattened portions of the casing into said oil holes.

References Cited in the file of this patent

UNITED STATES PATENTS

| Number | Name | Date |
|---|---|---|
| 2,465,042 | Schlenker et al. | Mar. 22, 1949 |

FOREIGN PATENTS

| Number | Country | Date |
|---|---|---|
| 669,087 | France | July 27, 1929 |